United States Patent
Thomasson

(10) Patent No.: US 9,702,586 B2
(45) Date of Patent: Jul. 11, 2017

(54) ENERGY STORAGE FOR PV WATER HEATER

(76) Inventor: Samuel L. Thomasson, Gilbert, AZ (US)

(*) Notice: Subject to any disclaimer, the term of this patent is extended or adjusted under 35 U.S.C. 154(b) by 1989 days.

(21) Appl. No.: 12/072,209

(22) Filed: Feb. 25, 2008

(65) Prior Publication Data

US 2009/0211567 A1    Aug. 27, 2009

(51) Int. Cl.
| | |
|---|---|
| H05B 3/68 | (2006.01) |
| F24H 1/18 | (2006.01) |
| F24H 1/20 | (2006.01) |
| F24H 9/20 | (2006.01) |

(52) U.S. Cl.
CPC ........... *F24H 1/203* (2013.01); *F24H 9/2021* (2013.01); *F24D 2220/08* (2013.01); *F24H 2240/09* (2013.01); *Y02B 10/20* (2013.01)

(58) Field of Classification Search
CPC .. F24D 2220/08; F24H 1/203; F24H 2240/09; F24H 9/2021
USPC ........... 219/448.11, 490, 497, 509; 392/441, 392/444, 447, 449, 451; 126/569, 585, 126/592, 593, 595
See application file for complete search history.

(56) References Cited

U.S. PATENT DOCUMENTS

| | | | | |
|---|---|---|---|---|
| 4,165,732 A | * | 8/1979 | Morin | 126/572 |
| 4,568,821 A | * | 2/1986 | Boe | 219/419 |
| 4,948,948 A | | 8/1990 | Lesage | |
| 5,293,447 A | * | 3/1994 | Fanney et al. | 392/449 |
| 5,317,670 A | * | 5/1994 | Elia | 392/464 |

FOREIGN PATENT DOCUMENTS

| | | |
|---|---|---|
| JP | 2002-057292 A | 2/2002 |
| JP | 3540729 B2 | 4/2004 |

* cited by examiner

*Primary Examiner* — Sang Y Paik
(74) *Attorney, Agent, or Firm* — Cahill Glazer PLC

(57) ABSTRACT

A system for heating water includes a first tank containing water and a heater element for heating the water, a solar panel, a control circuit coupling the solar panel to the heater element, and a second tank. The control circuit couples power to the heater element in proportion to available sunlight. The maximum temperature of the water in the first tank is higher than the maximum temperature of the water in the second tank. Water is drawn from the system through the second tank.

5 Claims, 6 Drawing Sheets

ENERGY STORAGE FOR PV WATER HEATER

FIELD OF THE INVENTION

This invention relates to water heaters and, in particular, to a water heater powered by electricity from a photovoltaic solar panel.

BACKGROUND OF THE INVENTION

The number of solar water heaters in use is less than one percent of the total number of water heaters. Of these, the vast majority are solar thermal water heaters. That is, solar energy directly heats water in a collector containing a plurality of pipes containing water. It is also known to convert solar energy to electricity and use the electricity to heat the water. This is solar photovoltaic (PV) water heating.

Solar thermal water heaters are not widely used because of problems of durability, difficulty of installation, weight, and relatively high initial cost. Durability includes problems with freezing, leakage, pump failure, and hard (mineral bearing) water. Installation has often proved difficult, requiring roof penetrations for the plumbing that transports water to and from solar collectors (arrays of pipes containing water that is heated by the sun).

U.S. Pat. No. 4,165,732 (Morin) discloses a solar voltaic preheat tank in combination with an electrically heated main tank. The temperature of the preheat tank is lower than the temperature of the main tank.

U.S. Pat. No. 4,568,821 (Boe) discloses a water heating system having two tanks, a main tank heated by electricity or gas, and a solar thermal preheat tank. The main tank is normally off unless demand exceeds supply from the preheat tank. The main tank is bypassed when the preheat tank is used.

U.S. Pat. No. 4,948,948 (Lesage) discloses an electric water heater having plural heater elements. The elements dissipate different amounts of power from each other and are controlled by a timer for limiting peak demand on a power grid by selecting an element of less than maximum power.

U.S. Pat. No. 5,293,447 (Fanney et al.) discloses a solar voltaic water heater. A microprocessor controls a set of electrical relays that connect the photovoltaic module to several resistive heating elements in a manner that best matches the instantaneous operating characteristics of a photovoltaic module.

In general, a preheating tank is used in the prior art to reduce the load on a main tank by raising the temperature of the water from a cold water supply. While some attempt (Fanney et al.) is made to use photoelectric power efficiently, a point is reached in a single tank system at which available solar energy is not used because reduced demand has permitted the water to reach a maximum safe temperature, e.g. 140° F. (60° C.). Basically, the demand for hot water and the demand for solar energy do not match. A demand for large amounts of hot water, especially around sunrise, can significantly outstrip supply. The only solution is to increase the size of the tank, which increases rather than decreases the amount of energy needed.

In view of the foregoing, it is therefore an object of the invention to provide a solar photovoltaic preheat that absorbs available solar energy.

Another object of the invention is to improve the efficiency of conventionally powered water heaters.

A further object of the invention is to provide a photovoltaic water heater that absorbs energy in proportion to availability.

SUMMARY OF THE INVENTION

The foregoing objects are achieved by this invention in which a system for heating water includes a first tank containing water and a heater element for heating the water, a solar panel, a control circuit coupling the solar panel to the heater element, and a second tank. The control circuit couples power to the heater element in proportion to available sunlight. The maximum temperature of the water in the first tank is higher than the maximum temperature of the water in the second tank. Water is drawn from the system through the second tank.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
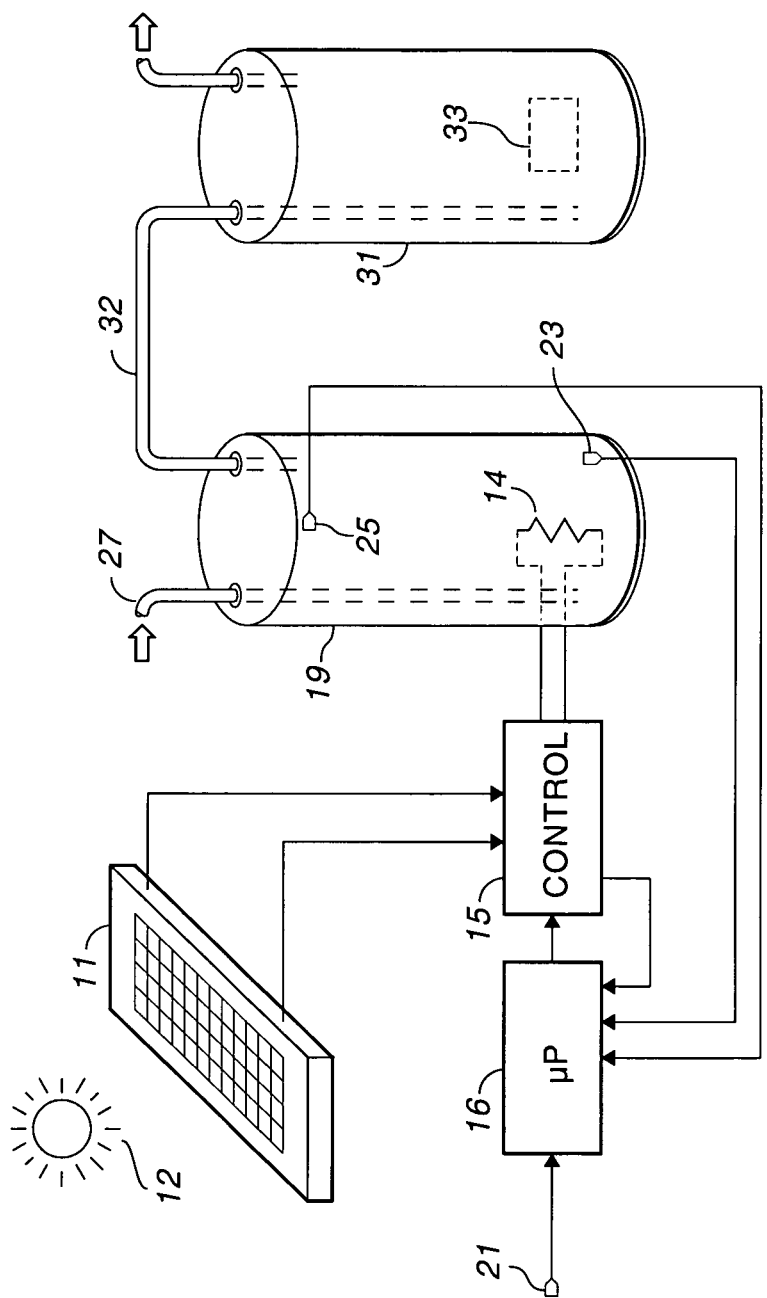
FIG. 1 illustrates a photovoltaic water heater constructed in accordance with a preferred embodiment of the invention.

In FIG. 1, solar panel 11 converts photons from sun 12 into an electric current. The electric current is applied to heater element 14 by control circuit 15. Heater element 14 converts the electric current to heat, thereby heating the water in tank 19. Solar panel 11 can be of any current or future design. The only constraint on the design is that heater element 14 be compatible with the voltage and current produced by panel 11.

In control circuit 15, semiconductor or solid state switching is preferred to relays, although either can be used in control circuit 15 for varying the power supplied to heater element 14. Heater element 14 includes one or more electrodes. If plural electrodes are used, then control circuit 15 can switch the electrodes in series or parallel combinations to provide the desired level of heating. Alternatively, pulsed direct current and switched electrodes can be used together to control the amount of power dissipated within tank 19.

Control circuit 15 also provides feedback to microprocessor 16, e.g. power level to heater element 14, voltage and current data on solar panel 11. Microprocessor 16 is preferably a single microcontroller chip having all necessary input/output (I/O), analog to digital (A/D) conversion, timing (including clock/calendar functions), and logic on a single chip. Alternately, separate devices for I/O, computation, conversion, and timing can be used.

Microprocessor 16 has several sense inputs, including photocell 21, thermocouple 23, and thermocouple 25. Photocell 21 provides a signal representing the level of available sunlight. Thermocouple 23 produces a signal representing the temperature of the water at the bottom of tank 19. Thermocouple 25 produces a signal representing the temperature of the water at the top of tank 19. Other transducers could be used as well; e.g. to sense whether or not tank 19 contains water, at least above the height of heater element 14, and to sense the flow of water to and from the tank. Water flow can be sensed indirectly as rate of change of temperature.

Water heater 31 has an inlet coupled to the output of tank 19 by pipe 32. Tank 19 is heated independently of the operation of water heater 31. Thus, the invention can be used with existing installations without modification to the existing installation, except for the plumbing connection. That is a thermostat or other mechanism (not shown) controls to operation of heat source 33, which can be oil, gas, electric, or even another solar heater.

A PV water heater constructed in accordance with the invention operates like a heat sink, absorbing whatever energy is available from panel 11 and storing the energy as heated water. Thus, problems of matching a load with available power are avoided. In its simplest form, control circuit 15 could include a switch, closed at least during daylight, to couple panel 11 directly to heater 14.

The cold water entering inlet 27 mixes with the water stored in tank 19, cooling the stored water. Similarly, the warmed water entering tank 31 from pipe 32 mixes with the water in tank 31, transferring heat to the water in tank 31. Thus, even though the water in tank 19 may be at 160° F., the water is isolated from a user and is cooled by mixing in tank 31.

Depending upon the size of panel 11, the storage capacity of tank 19, and other circumstances, water in tank 19 could be heated above 160° F., the preferred upper limit. Thermocouples 23 and 24 provide feedback for limiting applied power, should limiting become necessary. It is also preferred that the water in tank 19 not be heated above 180° F. to avoid boiling the water on the surface of heater element 14. Building codes may also restrict the maximum temperature of the water in tank 19.

One can simulate the operation of the invention by assuming one gallon flows through the system and calculating the average temperature at the end of each gallon. Thus, for example, with an inlet temperature of 60° F. and the first tank having a capacity of 20 gallons at a temperature of 160° F., the temperature after one gallon of cold water has flowed into the tank is (1×60+19×160)/20 or 155° F. For a twenty gallon main tank at 120° F. receiving the one gallon at 155° F. from the first tank, the resulting average temperature is 122° F. One then continues the process for each additional gallon through the system.

FIGS. 2-5 illustrate the result of simulations based upon the following initial conditions. The first tank is at 160° F. and the second tank is at 120° F., initially, in all cases. No input power is used. The system is "coasting" from the initial conditions. This represent the worst case situation of a power failure (even gas water heaters need electricity for control and for ignition).

Figure 2:
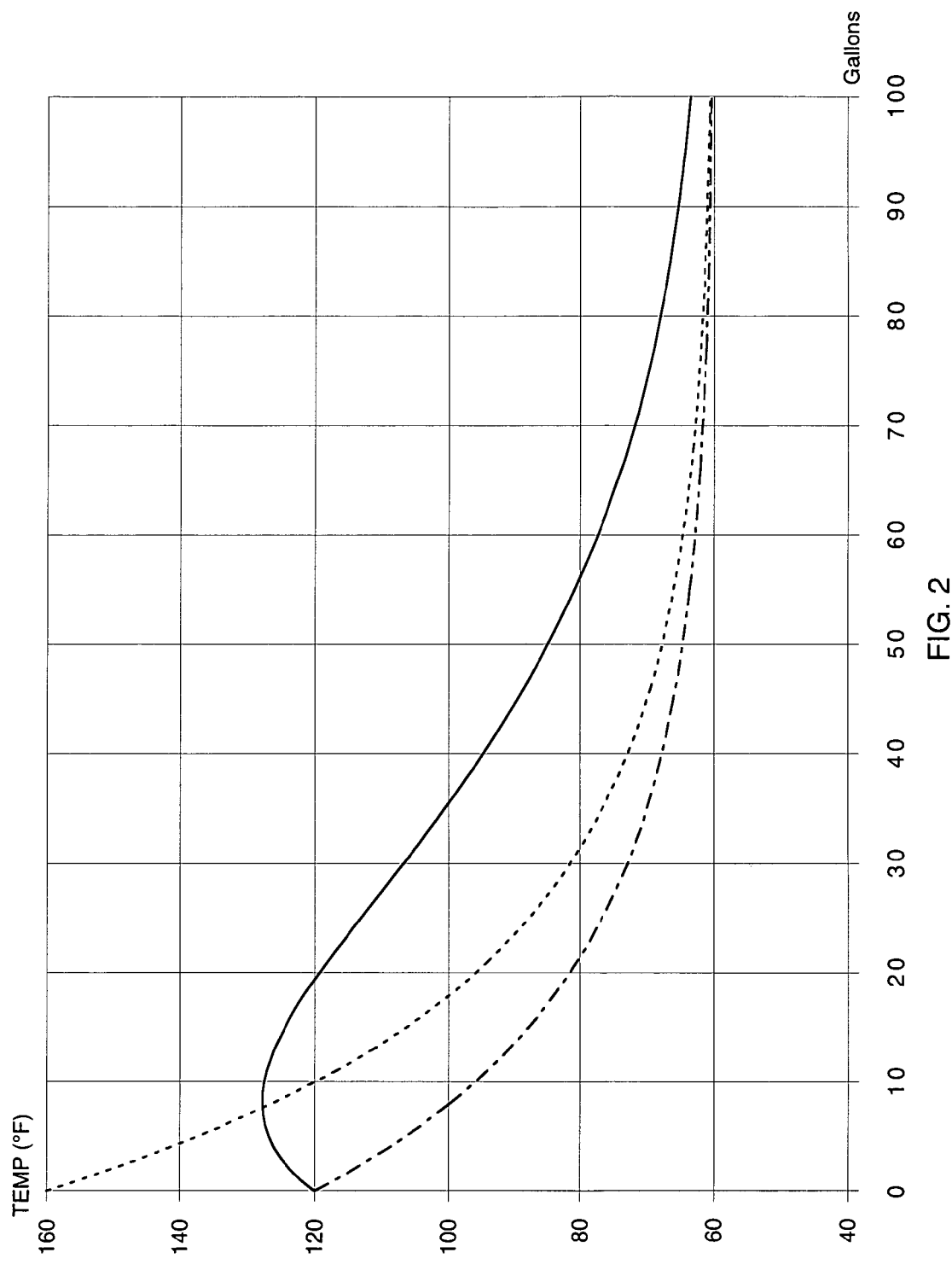
FIG. 2 is a chart illustrating the operation of the photovoltaic water heater illustrated in FIG. 1.
Figure 3:
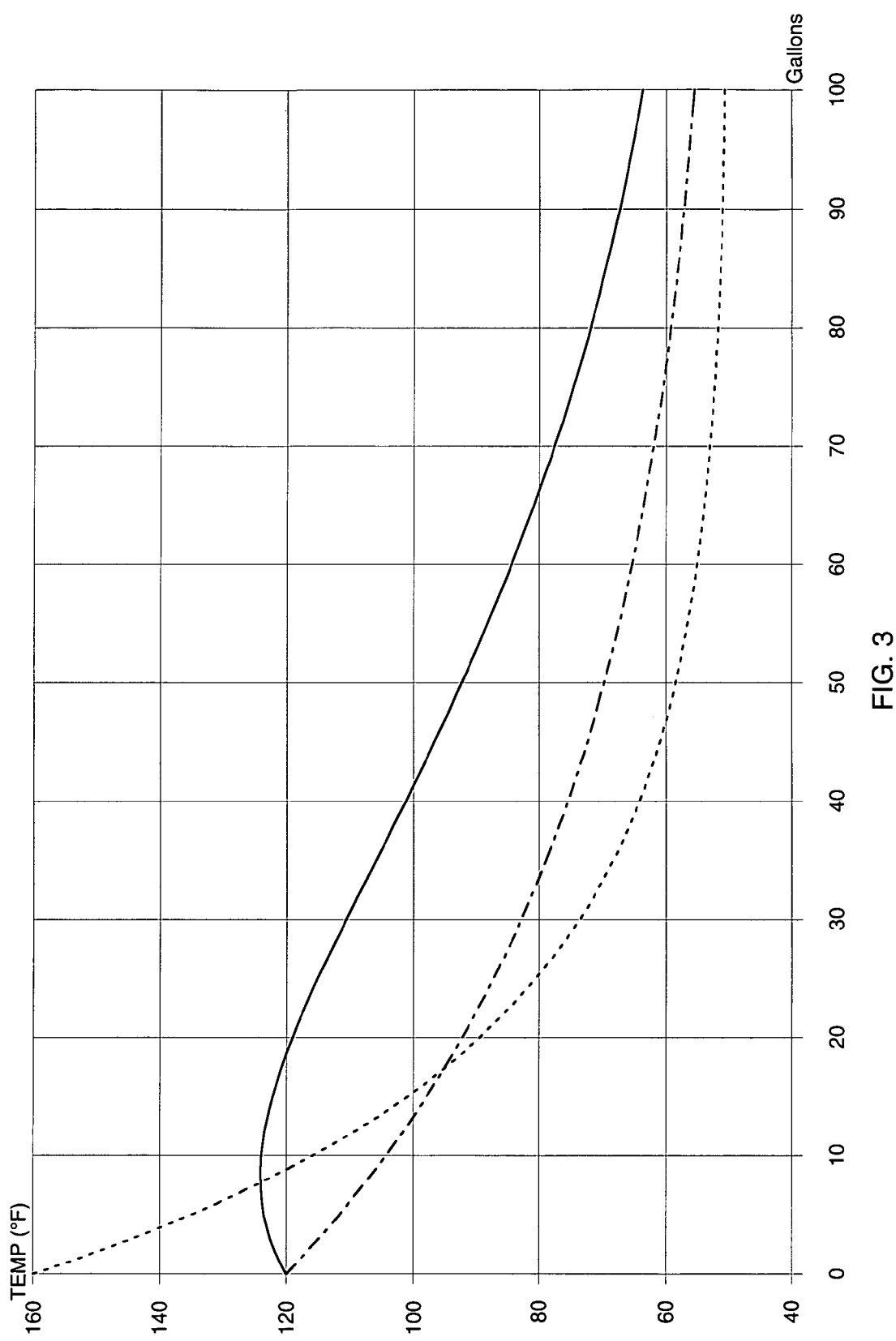
FIG. 3 is a chart illustrating the operation of the photovoltaic water heater illustrated in FIG. 1.
Figure 4:
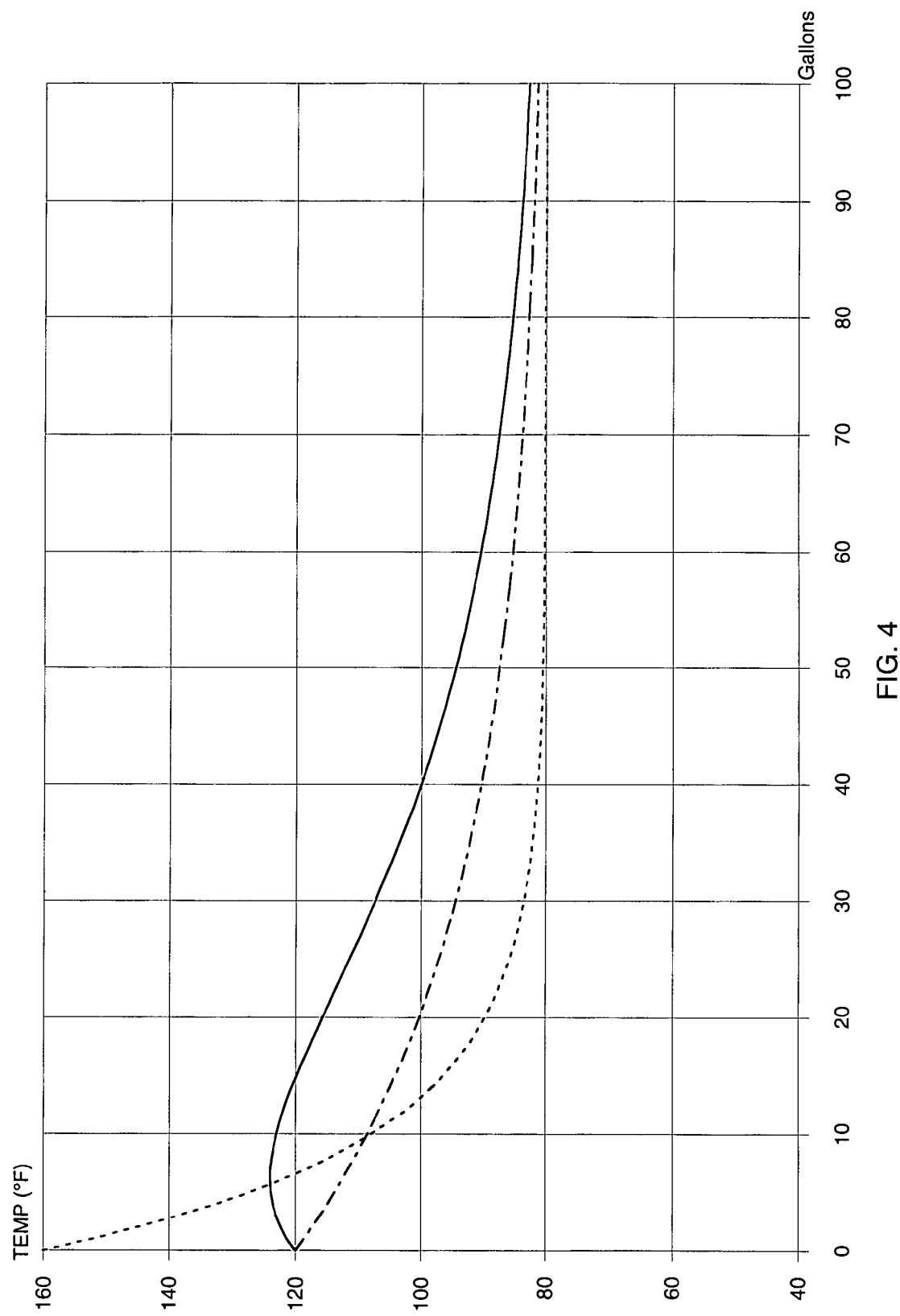
FIG. 4 is a chart illustrating the operation of the photovoltaic water heater illustrated in FIG. 1.
Figure 5:
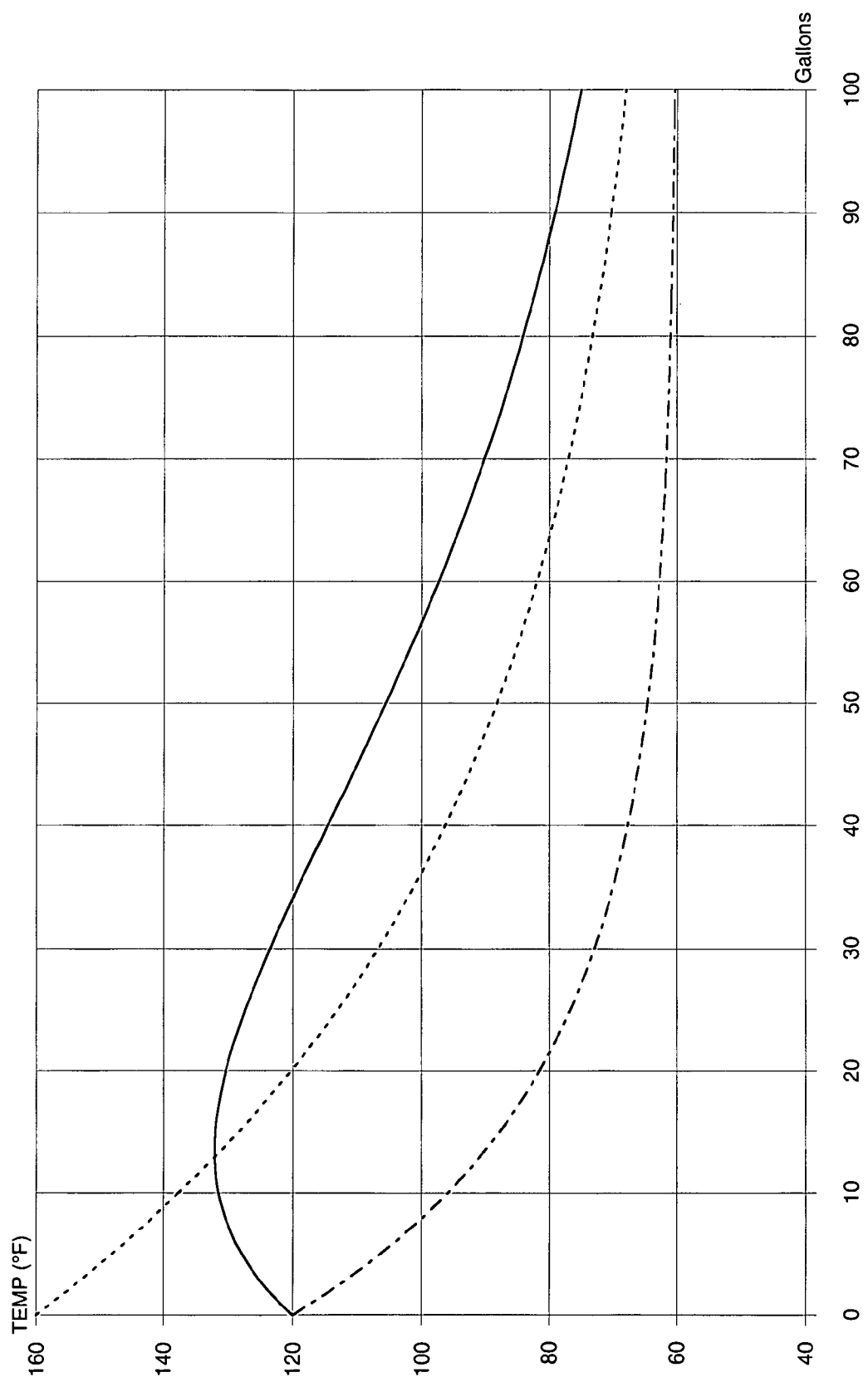
FIG. 5 is a chart illustrating the operation of the photovoltaic water heater illustrated in FIG. 1.

|  | Inlet Temp. | Tank 19 (gal.) | Tank 31 (gal.) |
| --- | --- | --- | --- |
| FIG. 2 | 60° F. | 20 | 20 |
| FIG. 3 | 50° F. | 20 | 40 |
| FIG. 4 | 80° F. | 10 | 30 |
| FIG. 5 | 60° F. | 40 | 20 |

The solid lines in FIGS. 2-5 represent the temperature of the water drawn from the system. The dashed lines in FIGS. 2-5 represent the outlet temperature of the PV tank. The dot-dash lines represent the temperature of the water drawn from tank 31 under the same conditions of inlet temperature and tank capacity but without a PV heater constructed in accordance with the invention.

In FIG. 2, where the tanks have the same capacity, thirty-five gallons of water above 100° F. is available from a twenty gallon main water heater. The initial rise in water temperature is moderate and well below the 140° F. limit considered safe for household use. FIG. 3 illustrates a tougher situation wherein the supply water is at 50° F., as it can be in northern climates, and the PV tank is half the capacity of the main water heater. Even so, forty gallons of water at 100° F., or more, is available. Without a PV heater constructed in accordance with the invention, only about thirteen gallons of water at a temperature above 100° F. would be available.

FIG. 4 represents a situation in which the supply water has a temperature of 80° F., as it might in the American southwest, and the PV tank is considerably smaller than the main tank. Forty gallons of 100° F. water is available from a thirty gallon main tank.

FIG. 5 represents a situation in which the first tank is larger than the second tank, an unlikely but possible situation. In this case, the temperature rise of the water from tank 31 is greater than in FIG. 1, for example, but still much lower than 140° F.

Figure 6:
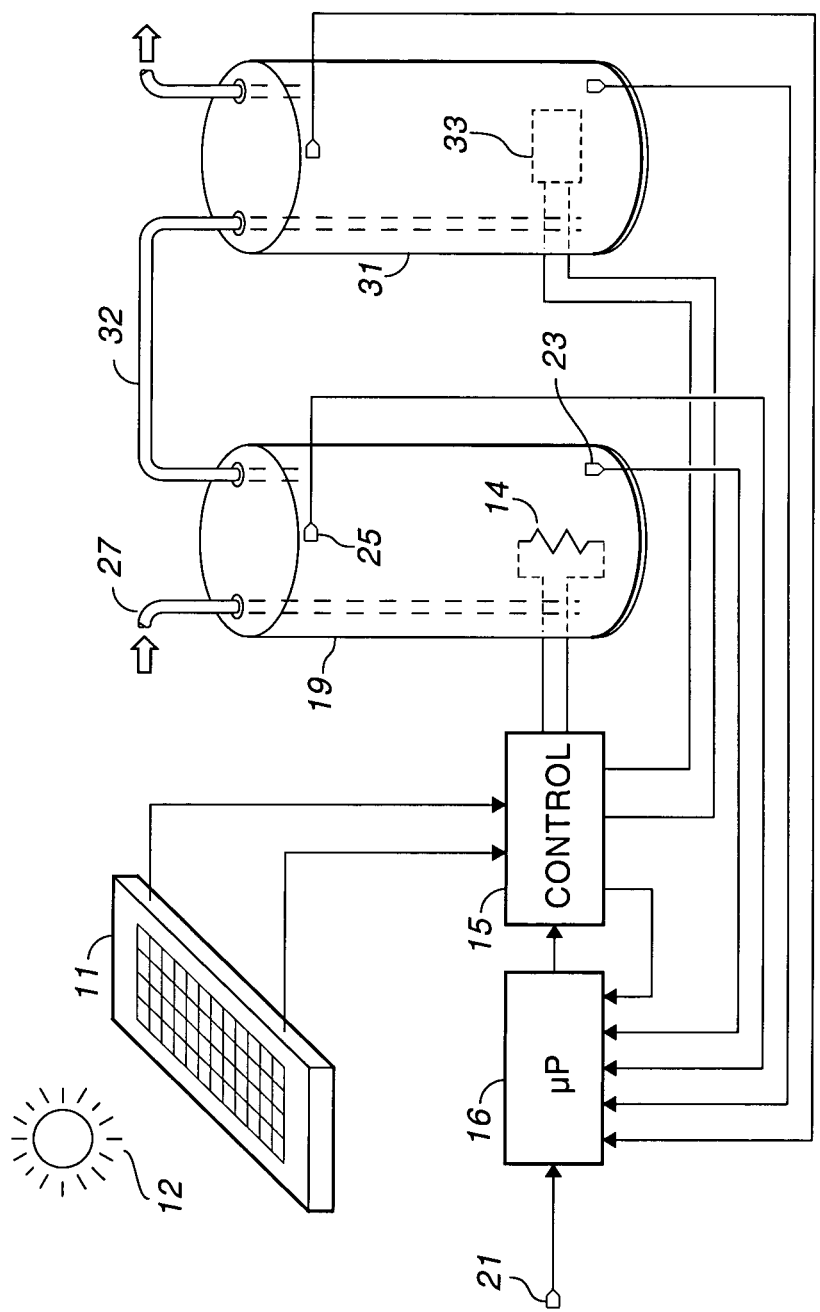
FIG. 6 illustrates a photovoltaic water heater constructed in accordance with an alternative embodiment of the invention.

FIG. 6 illustrates an alternative embodiment of the invention in which microprocessor 16 controls both water heaters. This provides additional flexibility and prevents, for example, heater element 33 from being activated prematurely after water temperature drops below a set minimum, e.g. 110° F. FIGS. 2-5 represent a worst case situation (no power). Normal operation would permit solar panel 11 to supply energy to heater element 14, which would considerably extend the time that $100^{+°}$ F. water is available, substantially reducing the energy required by the main water heater.

The invention thus provides a solar photovoltaic preheat that absorbs available solar energy and stores the energy as heated water. Energy is absorbed in proportion to availability. By drawing hot water from the main water heater, the solar heated water is always mixed with cooler water yet the amount of available hot water is increased substantially, thereby improving the efficiency of the main water heater.

Having thus described the invention, it will be apparent to those of skill in the art that various modifications can be made within the scope of the invention. For example, a mechanical switch can couple power from panel 11 to the heater element in proportion to available sunlight. Thus, in a minimal implementation of the invention, control circuit 15 could include one or more thermally sensitive switches for disconnecting panel 11 from heater element 14 when the water in tank 19 reaches a preset maximum temperature. A purely mechanical implementation of the invention is not preferred for reasons of reliability and the desire to provide more precise control.

What is claimed as the invention is:

1. A system for heating water comprising in combination:
    a) a first water tank having a water inlet for coupling to a source of water and having a water outlet;
    b) a first heater element associated with the first water tank for selectively heating water therein;
    c) a solar panel for generating electricity when exposed to the sun;

d) a first sensor associated with the first water tank for sensing a temperature of water within the first water tank;

e) a control circuit coupled to the solar panel, to the first sensor, and to the heater element, for selectively applying electricity generated by the solar panel to the heater element within the first water tank;

f) a second water tank having a water inlet coupled to the water outlet of the first water tank, and having a water outlet for supplying hot water to a user;

g) a second heater element associated with the second water tank for selectively heating water in the second water tank;

h) a second sensor associated with the second water tank for detecting whether water within the second water tank is at, or below, a first desired maximum temperature;

i) said control circuit being configured to allow water within the first water tank to be heated to a temperature higher than the first desired maximum temperature.

2. The system for heating water as set forth in claim 1 wherein the control circuit limits the temperature of the water in the first tank to a maximum temperature of 160 F.

3. The system for heating water as set forth in claim 1 wherein the control circuit is coupled to, and selectively operates, the second heater element said means and controls the operation of the second tank.

4. The system for heating water as set forth in claim 1 and further including at least one thermocouple for sensing the temperature of the water in the first tank and a microprocessor coupled to the first sensor said thermocouple and to said control circuit for limiting the temperature of the water in the first tank.

5. The system for heating water as set forth in claim 1 wherein the control circuit is coupled to, and selectively operates, the second heater element, and wherein said system further includes a microprocessor coupled to the first sensor, to the second sensor, and to the control circuit for limiting the temperature within the second water tank to a second desired maximum temperature, the second desired temperature being higher than the first desired maximum temperature.

* * * * *